Oct. 14, 1947. P. S. PROCISSI 2,428,893
CAR LOADING EQUIPMENT
Filed Oct. 26, 1944 4 Sheets-Sheet 1

Inventor
Paul S. Procissi
By Blackmor, Spencer & Flint
Attorneys

Oct. 14, 1947.  P. S. PROCISSI  2,428,893
CAR LOADING EQUIPMENT
Filed Oct. 26, 1944  4 Sheets-Sheet 2

Inventor
Paul S. Procissi
By Blackmor, Spencer & Flint
Attorneys

Oct. 14, 1947.   P. S. PROCISSI   2,428,893
CAR LOADING EQUIPMENT
Filed Oct. 26, 1944   4 Sheets-Sheet 3
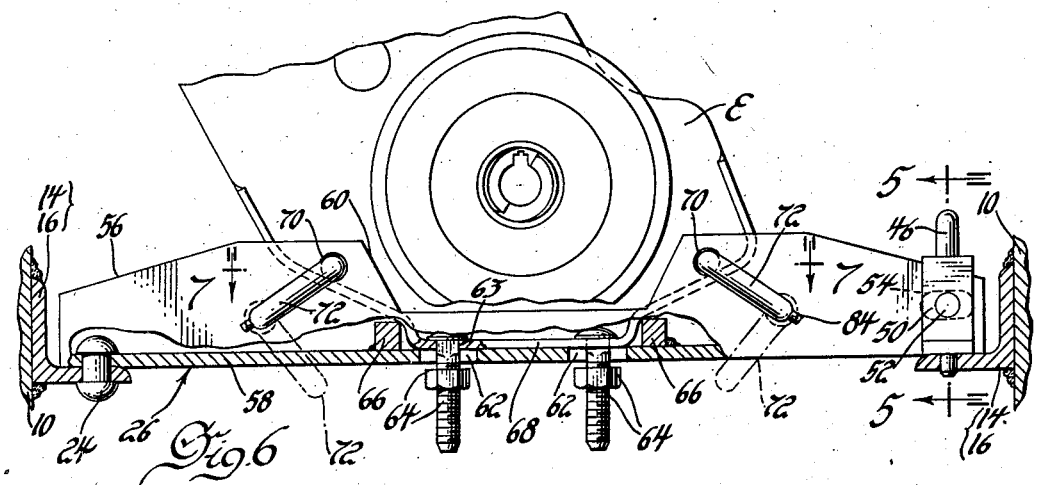
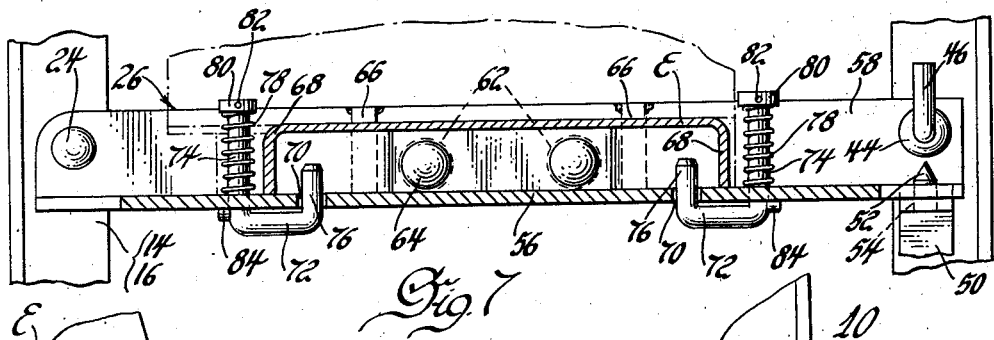
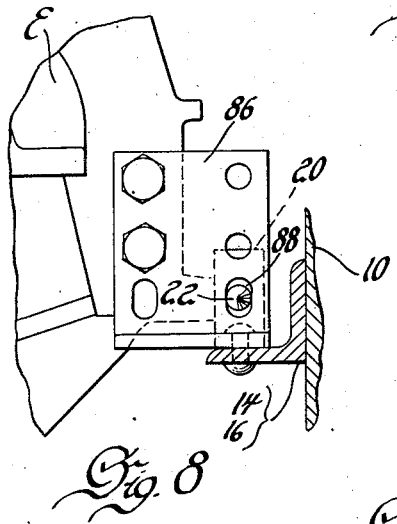
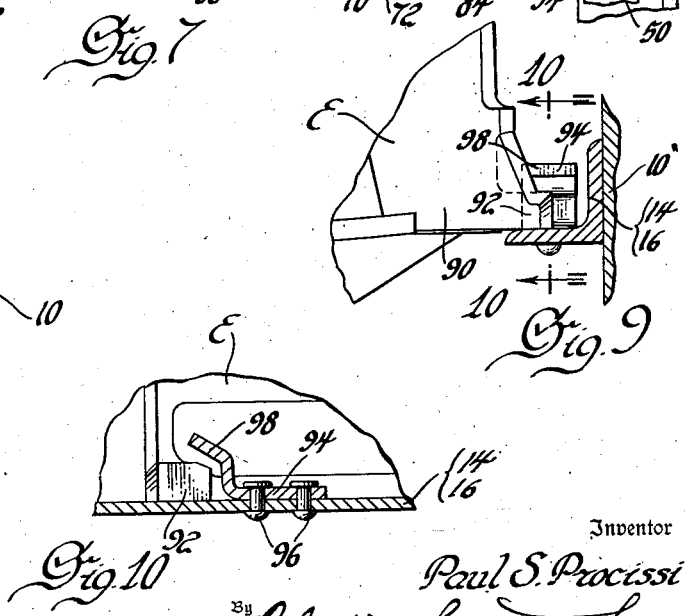
Inventor
Paul S. Procissi

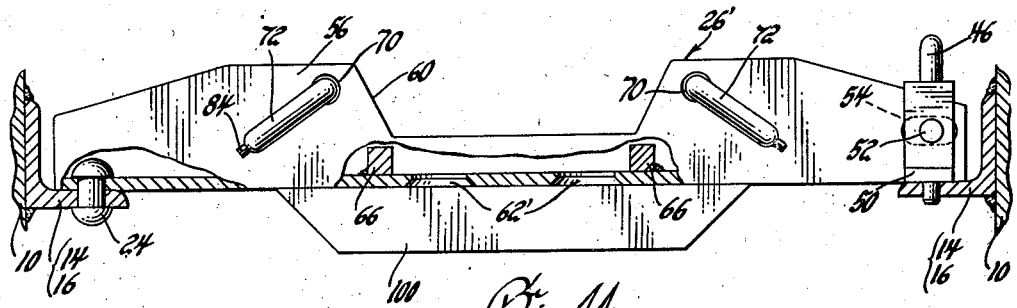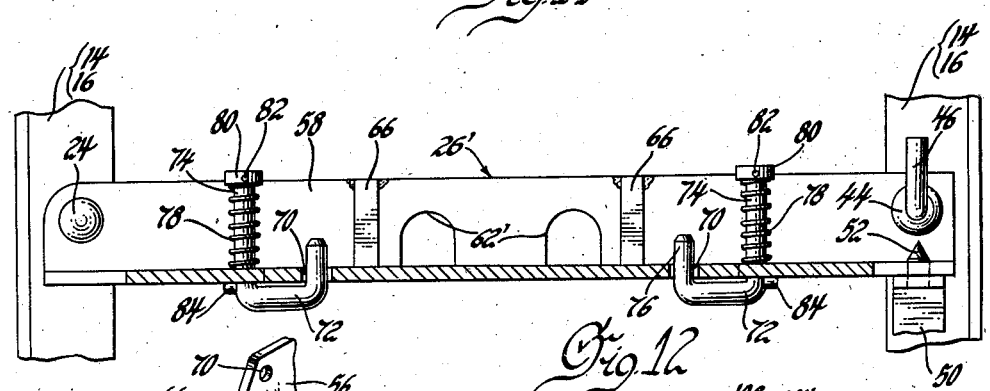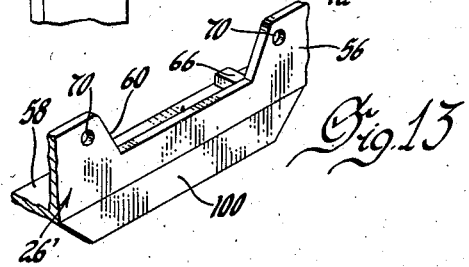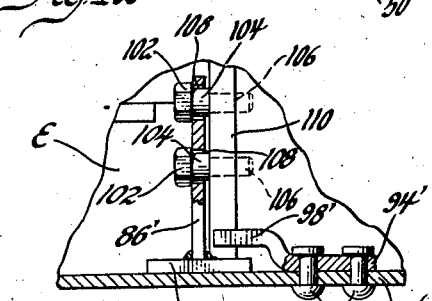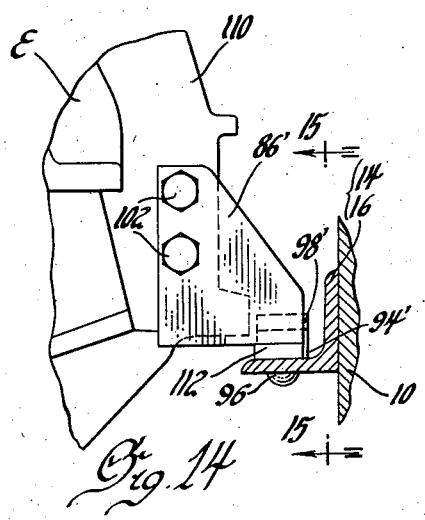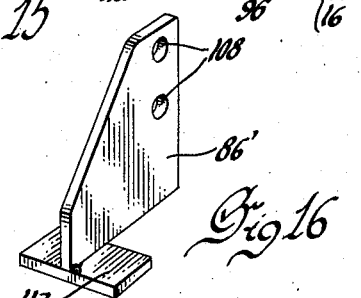

Patented Oct. 14, 1947

2,428,893

UNITED STATES PATENT OFFICE 2,428,893

CAR LOADING EQUIPMENT

Paul S. Procissi, Flint, Mich., assignor to General Motors Corporation, Detroit, Mich., a corporation of Delaware Application October 26, 1944, Serial No. 560,420

17 Claims. (Cl. 105—367)

This invention relates to loading equipment and has particular reference to a loading installation in a box car for loading and shipping engines used on automotive vehicles.

In the past the loading equipment has made use of greased rails, special trucks and transport skids, and many loose and removable parts in the loading and unloading of the engines. It is the object of the present invention to eliminate these unnecessary parts and their application and to equip the car with an installation which is a permanent part of the box car and will comprise no removable parts such as chains, blocks, levers, bolts, skids, etc.

In accordance with the invention the inside of the box car is equipped with a plurality of upright supports secured to the floor and to the sides of the car. In the embodiment shown there are six rows of uprights spaced transversely of the car and to the outermost row of supports at the sides of the car two rails are secured in superposed relation. To each of the four uprights intermediate the sides of the car two rails are secured at each side and in the same planes as the rails secured to the side uprights. This installation results in making five rows comprising two tiers each.

Along the length of the rails there are provided brackets for supporting the rear part of the engine and transverse supports extending from one rail to another are provided for supporting the front end of the engine. Suitable brackets are loosely connected to the rear of the engine for engaging with the brackets secured to the rails. The supports for the front of the engine are permanently pivoted to one rail and removably held to the adjacent rail. By releasing the removable connection the support may be swung into parallelism with the rail to which the support is pivoted. All of the supports engage the engine so that a given amount of flexibility is allowed; that is, the engine is not rigidly and immovably held relative to the supports, but it can move or oscillate a little in its supports.

On the drawing:

Figure 6 is an enlarged detailed view partially in section, showing the front support and the engine mounted thereon, the retaining bolts being shown in released position in dotted outline.

Figure 7 is a sectional, detailed view taken on the line 7—7 of Figure 6.

Figure 8 is a detailed view through one of the longitudinal rails showing one form of flexible support for the rear of the engine.

Figure 9 is a view similar to Figure 8 of a modification.

Figure 10 is a sectional, detailed view on the line 10—10 of Figure 9.

Figure 11 is an elevational view similar to Figure 6 of the preferred species of supporting member, parts being shown in section.

Figure 12 is a view similar to Figure 7 showing the support of Figure 11 in plan, a part thereof being shown in section.

Figure 13 is a perspective view showing the wing or flange on the preferred support.

Figure 14 is a view similar to Figure 8 showing the preferred form of bracket to support the rear of the engine.

Figure 15 is a side view of Figure 14 on the line 15—15 thereof.

Figure 16 is a perspective view of the preferred form of bracket.

As the supports for the front and the rear of the engine shown in Figures 1–10 inclusive are all the same, the description of but one will be given.

Figures 3, 4:
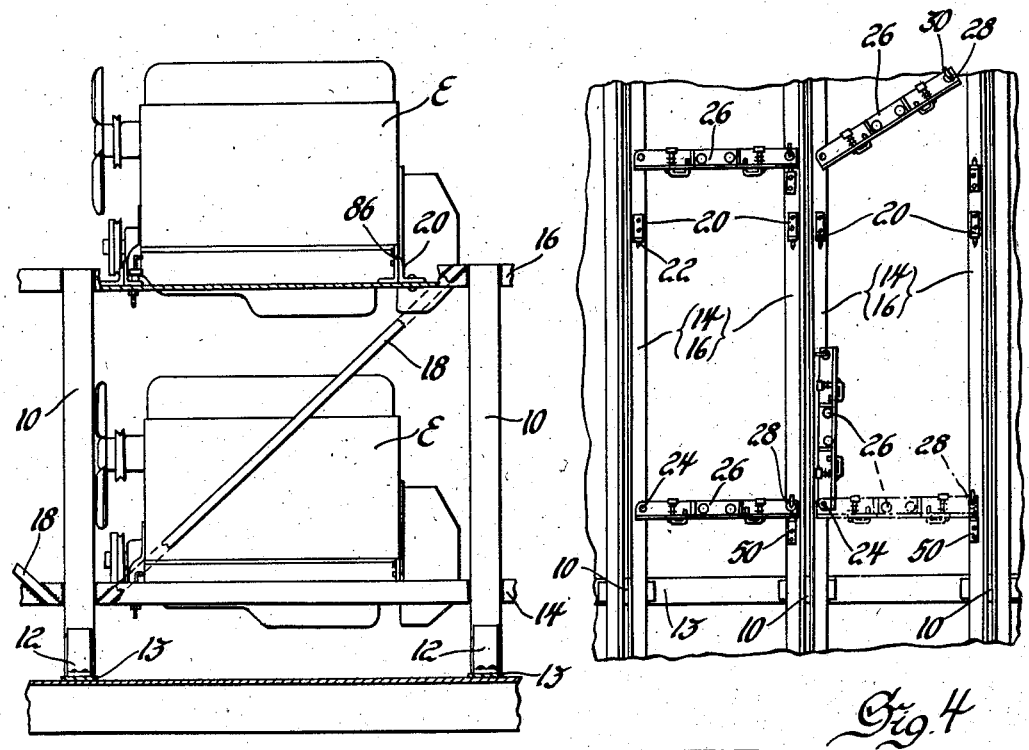
Figure 3 is a detailed side view partially in section showing two superposed engines mounted on the loading installation.
Figure 4 is a plan of a part of the loading equipment with two of the front supports released and one support shown swung to its position of parallelism with the rail, the normal position being shown in dotted outline.
Figure 5:
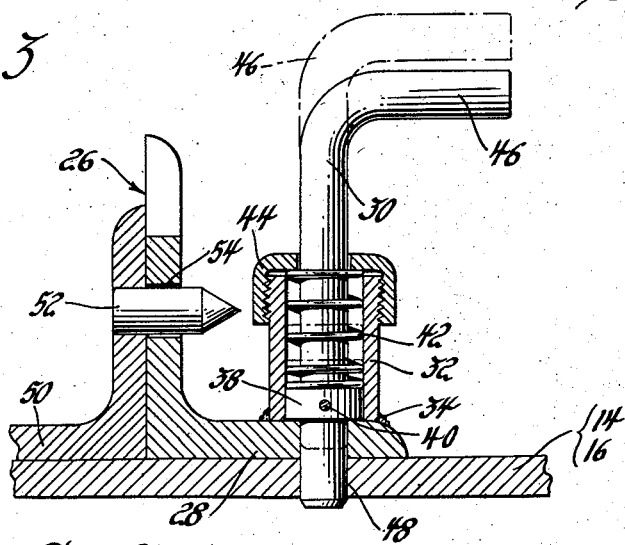
Figure 5 is an enlarged sectional detailed view through the removable connection of the front support taken on the line 5—5 of Figure 6, the holding bolt being shown in its released position in dotted outline.

Referring to the drawing the numeral 2 indicates a box car as a whole. The car has the usual roof 4, the sides 6 and floor or bottom 8. To the sides 6 there are secured the upright supports 10 and intermediate the sides there are secured to the floor the additional uprights 10. The brackets 12 are used to secure the uprights to the floor. Underneath the brackets and the supports reinforcing plates 13 are secured to the floor. Spaced a suitable distance from the floor 8, longitudinal rails 14 are secured to the uprights 10, such as by welding. Additional rails 16 are secured to the supports 10 at the top thereof and spaced sufficiently from the lower rails 14 to enable the proper positioning of an engine E on the rails 14 without interfering with the engine E mounted on the upper rails 16. Preferably, the rails 14 and 16 have a right angularly shaped cross section. The rails 14 and 16 are preferably interconnected by diagonal bracing members 18 (Figure 3).

At suitably spaced points along the tracks 14 and 16 there are secured the angle brackets 20, each of which has a pin 22 projecting away therefrom. The brackets act as retainers for the rear end of the engine.

Figure 1:
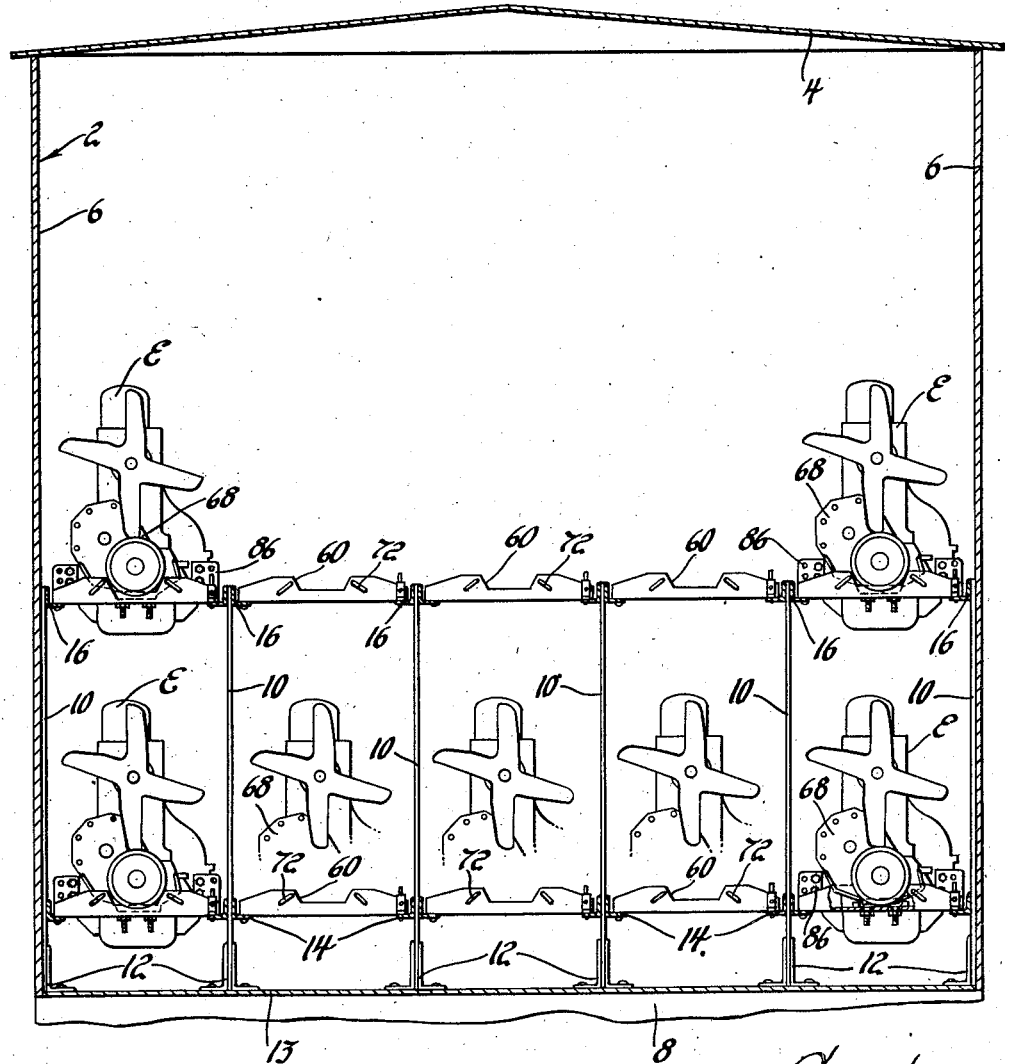
Figure 1 is a transverse, sectional view through a freight car showing the invention applied.
Figure 2:
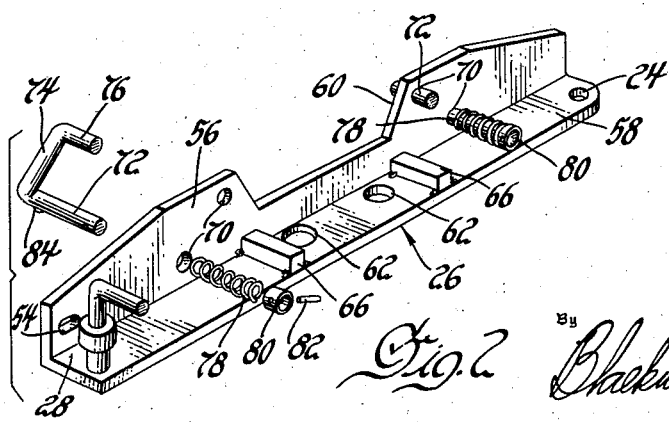
Figure 2 is a perspective detailed view of one of the supports for the front of the engine.

Spaced from each pair of brackets 20 there is pivoted at 24 to the rails 14 and 16 a front support indicated as a whole at 26 as shown in perspective in Figure 2. This support 26 extends from one rail 14 or 16 to the adjacent rail 14 or 16 and holds or retains the front end of the engine on the rails. The other end 28 is provided with a spring pressed bolt 30 for removably disconnecting it from the rails 14 or 16. The bolt is mounted in a cylinder 32 rigidly secured as at 34 to the support 26. Inside the cylinder a collar 38 is secured to the pin 30 by means of the dowel pin 40 and over the collar 38 there is positioned inside the housing 32 a coil spring 42 which is held in the housing by means of the closure or cap 44 screw threaded to the outside of the housing 32. The bolt 30 has the right angularly bent handle 46 to enable it to be lifted against the tension of the spring and withdrawn from the opening 48 in the tracks 14 or 16. When the bolt 30 has been released, or moved to the dotted line position shown in Figure 5, the support 26 may be moved on its pivot 24 from the dotted line position shown in Figure 4 to the full line position or in parallelism with the rails 14 or 16.

The rails 14 and 16 have small brackets 50 secured thereto and each bracket is provided with the projecting pin 52 which is received in an opening 54 in the upright flange 56 of the support 26 when the support is in the position shown in Figure 6 or its operative position to receive an engine. In its operative position as shown in Figures 6 and 7, the support 26 abuts the bracket 50.

The support 26 is generally right angular in shape and the lower flange 58 thereof rests on the rails 14 or 16. The vertical flange 56 has a cutout 60 at its center to avoid interference with the engine when in position on the support.

The flange 58 is provided with two oversized openings 62 which mate with openings 63 in a flange 68 on the engine. When the engine is positioned on the support the openings 62 and 63 are superimposed and suitable bolts and nuts 64, which are ordinarily used to hold the front of the engine on the vehicle are passed through the oversized openings 62 and are out of contact therewith when the engine is supported in the car. The flange 58 is also provided with blocks 66 which are properly spaced so that the flange 68 of the engine will be received therebetween. The blocks aid in positioning the engine openings over the openings 62 in the flange 58 and also serve as rests for the engine.

The vertical flange 56 is provided with two pairs of openings 70 at each side of the center and these openings are adapted to receive retaining bolts 72. The heads of these bolts are J-shaped as indicated at 74 and the shorter leg 76 of the J is adapted to be received in one of the openings 70. The longer leg of the J extends through the opening 70 in the flange 56 and is surrounded by a coil spring 78 held on the bolt 72 by means of a collar 80 and a dowel pin 82. Each bolt 72 is provided with a projection 84 to prevent the J head from passing too close to the flange 56. The purpose of this construction is to afford a better grip for the operator or loader to grasp the bolt and pull it away from the flange 56 so that the engine E may be positioned on the support. When the engine is on the support the bolt 72 is shifted from the dotted line position of Figure 6 to the full line position in Figures 6 and 7 to allow the shorter leg 76 to enter the upper opening 70 and cause the shorter leg 76 to extend over the flange 68 on the engine housing to assist in holding the engine in place. In Figure 6 the released position of the bolts 72 is shown in dotted outline and the operative position in full outline.

The rear part of the engine at the clutch has secured thereto at each side a bracket 86. The bolts which secure the brackets 86 to the clutch housing of the engine pass through oversized openings in the bracket so that the support or mounting is loose or flexible. The brackets 86 extend away from the engine and over the rails 14 to 16 to serve as a support for the rear part of the engine. The brackets 86 have an oversized opening 88 therein which is adapted to receive with a loose fit the pin 22 of the bracket 20. When the brackets 86 at the two sides of the engine are positioned so that the pins 22 are received in the openings 88 the rear of the engine will be flexibly or loosely held to the rails, i. e., a given amount of play is allowed to the engine when in position on its supports.

After the rear end of the engine has been mounted by means of the brackets 20 and 86, the front part of the engine is then positioned on the flange 58 of the support 26 with the openings 63 in the engine flange 68 over the openings 62 in the support so that the bolts and nuts 64 can pass through the openings 62 as shown in Figure 6. The bolts 72 are then moved from the dotted line position in Figure 6 to the full line position so that the shorter leg 76 thereof will be positioned inside the flange 68 as is shown in Figure 7 but not rigidly or tightly hold the engine. Some flexibility is allowed. This will hold the engine securely but somewhat flexibly on the support 26 and due to the fact that the opening 86 in the bracket 86 is slightly larger than the pin 22 a small amount of flexibility is allowed in the bracket 86 at the engine.

When the support 26 is moved from the full line position at the right of Figure 4 to the dotted line position shown at the right of Figure 4, the pin 52 of the bracket 50 will be received in the opening 54 in the support and the bolt 30 will be allowed to drop in the opening 48 in the rail 14 or 16 firmly to hold the support in place.

With box cars which have the permanent equipment of the invention installed therein there is provided an overhead track and crane (not shown for the reason that it forms no part of the invention). The engines are moved into the car on the overhead track and allowed to drop in place by the operator loading the car by manipulating the crane. Each successive engine is secured in place until both tiers in the five rows are completely filled.

At the unloading station the operation is, of course, reversed in that the overhead track and crane are used to remove the engines, one by one, and when an engine has been removed, the front support 26 is moved from the dotted line position of Figure 4 to the full line position at the right of the figure to enable the operator easily to pass along the rows between the uprights 10. When all the engines have been unloaded, the car is returned empty to its shipping point to enable it to be reloaded.

Figures 9 and 10 show a modification of the structure of Figure 8. The structure of these figures enables the elimination of the brackets 86. The clutch housing 90 at both sides of the engine E has formed thereon integral lugs 92. These lugs 92 are adapted to rest on the rails 14 or 16. Brackets 94 are secured by rivets 96 to the rails 14 and 16. The end 98 of the brackets is upwardly bent as shown in Figure 10 and when the engine E is in position on the rails 14 or 16 the bent end 98 extends over the lugs or projections 92 to hold the rear end of the engine in place on the rails 14 or 16. The lugs can be in contact with the ends 98, or are preferably slightly spaced therefrom, as shown in Figure 10, to give flexibility to the mounting of the engine.

The preferred species of front engine support and rear engine support is shown in Figures 11 to 16 inclusive.

In Figures 11, 12 and 13 the front support 26' has a central cutout 60 and at its lower side below the cutout the support is provided with a downwardly extending flange or wing 100 to strengthen the support 26' due to the fact that the openings 62' in the support are larger and therefore somewhat weaken the support 26'. This flange 100 is preferably welded in place.

In Figure 12 the holes 62' are larger than the holes 62 and shaped as shown in the view, in order that the nuts and bolts 64 may the easier pass through the openings when mounting and dismounting the engine.

The preferred type of bracket 86' is shown in Figures 14, 15 and 16. This bracket 86' is attached to the crank case of the engine E by means of the bolts 102. These bolts are of a special type and the detailed construction thereof is shown best in Figure 15. The bolt has the larger shank portion 104 and the smaller threaded shank portion 106. The larger shank portion 104 fits in the openings 108 in the bracket 86'. These holes 108 are larger to an unusual extent than the diameter of the shank part 104 so that there is a loose and flexible fit between the bracket and the bolt. The shank part 104 is larger than the threaded openings in the flange 110 of the crank case and when screwed into position the shoulder or end face of the shank part 104 will abut against the side face of the flange 110.

As is best seen in Figure 15 the thickness of the bracket 86' is less than the axial length of the shank part 104 so that the bracket 86' will have a loose and free fit between the head of the bolt 102 and the flange 110 of the crank case.

A shoe 112 is welded to the bottom of the bracket 86' and extends on both sides thereof to form with the bracket 86' a T-head. The reason for the T-head is to enable the same bracket to be used on either side of the engine.

The rails 14 and 16 adjacent the two sides of the engine have rigidly secured thereto brackets 94', the ends 98' of which are bent away from the main part of the bracket so that it is spaced from the rails 14 or 16. In this spaced part as shown in Figure 15 one side of the T shoe 112 of the bracket 86' is received. In the final position of the engine on the rails 14 and 16, the shoe 112 does not contact with the part 98', but a given amount of play, or a loose connection, is allowed as is shown in Figure 15. This gives an amount of flexibility to the engine and enables it to move within confined limits in its supports on the rails 14 and 16.

As a result of the mounting of the engine on the supports shown in Figures 11 to 16 inclusive, a certain degree of flexibility is given to the mounting, that is, the engine is allowed to move within limits in its supports. It has been found that this is much preferable to a rigid mounting and will enable the engine better to be transported in the car. With a rigid mounting it has been found that parts will break and in some instances the engine crank case has been cracked.

The advantage of the invention is that there is no loose equipment to be stored or returned. All of the equipment of the car is attached and is not separable so that it cannot be lost.

A great deal of labor is eliminated because it is unnecessary to use loading skids and special trucks. There is also considerable time and labor saved in that it is unnecessary to use any clips, pins, chains, or the like.

I claim:

1. In an engine loading installation for application to a railroad car for supporting a number of engines, a plurality of longitudinally and transversely spaced upright posts rigidly secured in place in the car, a plurality of parallel horizontal rails rigidly secured to said upright posts in spaced relation above the car floor, a plurality of rigid means secured to the rails at spaced points to serve as engine retainers one for one end of each engine supported on said rails, and a plurality of engine supports extending across from one rail to the adjacent rail and serving one for each engine as an engine support and retainer for the other end of the engine.

2. In an engine loading installation for application to a railroad car for supporting a number of engines, a plurality of longitudinally and transversely spaced upright posts rigidly secured in place in the car, a plurality of parallel horizontal rails rigidly secured to said upright posts in spaced relation above the car floor, means secured to the rails at spaced points to serve as engine retainers one for each end of each engine, and a plurality of engine supports extending across from one rail to the adjacent rail and serving one for each engine as a retainer for the other end of the engine, said engine supports being pivoted at one end to one of said rails and releasably connected to the adjacent rail, the release of said releasable connection enabling the support to be moved on its pivot and positioned in parallelism with the rail to which it is pivoted.

3. In an engine loading installation for application to a railroad car for supporting a number of engines, a plurality of longitudinally and transversely spaced upright posts rigidly secured in place in the car, a plurality of parallel horizontal rails rigidly secured to said upright posts in spaced relation above the car floor, means secured to the rails at spaced points to serve as engine retainers one for one end of each engine, and a plurality of engine supports extending across from one rail to the adjacent rail and serving one for each engine as a retainer for the other end of the engine, said engine supports having secured thereto means to engage with the engines to hold the same on the supports and prevent their removal in transit.

4. In an engine loading installation for application to a railroad car for supporting a number of engines, a plurality of longitudinally and transversely spaced upright posts rigidly secured in place in the car, a plurality of parallel horizontal rails rigidly secured to said upright posts in spaced relation above the car floor, means secured to the rails at spaced points to serve as engine retainers one for one end of each engine, a plurality of engine supports extending across from one rail to the adjacent rail and serving as retainers respectively for the other end of each engine, said engine supports having a plurality of spring pressed bolts mounted therein for engagement with the engines to hold the same on the supports and prevent their removal in transit.

5. In an engine loading installation for application to a railroad car for supporting a number of engines, a plurality of longitudinally and transversely spaced upright posts rigidly secured in place in the car, a plurality of parallel horizontal rails rigidly secured to said upright posts in spaced relation above the car floor, a plurality of engine supports extending across from one rail to the adjacent rail and serving as retainers each for one end of an engine, first brackets secured to the respective engines at each side and adjacent one end thereof, second brackets rigidly secured to the rails and adapted to cooperate with the first brackets, said first and second brackets having an interengaging connection to cause the other end of the engine to be held on the rails.

6. In a structure for loading a number of engines in a railroad car, a plurality of longitudinally and transversely spaced upright posts rigidly secured in place in the car, a plurality of parallel horizontal rails rigidly secured to said upright posts in spaced relation above the car floor, extensions on the clutch housings of the engines projecting away from the sides of the engines and at one end thereof, brackets rigidly secured to the rails along the length thereof and engageable, respectively, with the engine extensions when the engines are in place firmly to hold one end of each engine on the rails, and a plurality of engine supports extending across from one rail to the adjacent rail and serving one for each engine as a retainer for the other end of the engine.

7. Means to load a number of engines in a railroad car, comprising, a plurality of longitudinally and transversely spaced upright posts rigidly secured in place by the car, a plurality of parallel horizontal rails rigidly secured to said upright posts in spaced relation above the car floor, means secured to the rails at spaced points to serve as retainers for one end of the engines, a plurality of engine supports extending across from one rail to the adjacent rail and serving as supports for the other end of the engines, said engine supports having openings mating with openings in the engines, and removable means passing through the openings but out of contact with the supports.

8. In an engine loading installation for application to a railroad car for supporting a number of engines, a plurality of longitudinally and transversely spaced upright posts rigidly secured in place in the car, a plurality of parallel horizontal rails rigidly secured to said upright posts in spaced relation above the car floor, means secured to the rails at spaced points to serve each as a support for one end of one of the engines, a plurality of engine supports extending across from one rail to the adjacent rail and each serving as a retainer for the other end of an engine, and blocks secured to each engine support and adapted to be engaged by the engine to form rests for the engine when the engine is in place in the installation.

9. In an engine loading installation for application to a railroad car, a plurality of longitudinally and transversely spaced upright posts rigidly secured in place in the car, a plurality of parallel horizontal rails rigidly secured to said upright posts in spaced relation above the car floor and spaced vertically of the posts to form a plurality of tiers, said upright posts and longitudinal rails forming a plurality of rows extending the length of the car, each of said rows capable of supporting superposed tiers of engines, a plurality of rigid means secured to the rails at spaced points to serve as retainers for the engines, one at one end of each engine, and a plurality of engine supports extending across from one rail to the adjacent rail and serving as retainers for the other ends of the engines.

10. In an engine loading installation for application to and for supporting a number of engines in a railroad car, a plurality of longitudinally and transversely spaced upright posts rigidly secured in place in the car, a plurality of parallel horizontal rails rigidly secured to said upright posts in spaced relation above the car floor, a plurality of rigid means secured to the rails at spaced points to serve as retainers, each for one end of one of the engines, respectively, and a plurality of engine supports extending across from one rail to the adjacent rail and serving each as a retainer for the other end of the engines, respectively, said supports each having a strengthening flange secured thereto.

11. In an engine loading installation for application to a railroad car, a plurality of longitudinally and transversely spaced upright posts rigidly secured in place in the car, a plurality of parallel horizontal rails rigidly secured to said upright posts in spaced relation above the car floor, means secured to the rails at spaced points to serve as retainers for one end of the engines, the supporting of said engines by the retainers being non-rigid and enabling a limited amount of movement to the engines, and a plurality of engine supports extending across from one rail to the adjacent rail and serving as a retainer for the other end of the engines, said engine supports having secured thereto means to engage with the engines to hold the engines on the supports and prevent their removal in transit but enabling the engines to have a limited amount of movement.

12. In an engine loading installation for application to a railroad car, a plurality of longitudinally and transversely spaced upright posts rigidly secured in place in the car, a plurality of parallel horizontal rails rigidly secured to said upright posts in spaced relation above the car floor, a plurality of engine supports extending across from one rail to the adjacent rail and serving as retainers for the engines at one end thereof, respectively, first brackets secured to each engine at both sides and adjacent the other end thereof by a loose fit, second brackets rigidly secured to the rails and adapted to cooperate with the first brackets, said first and second brackets having a loose interconnection to cause said other end of the engines to be held on the rails with the allowance of a small amount of movement.

13. In an engine loading installation for application to a railroad car, a plurality of longitudinally and transversely spaced upright posts rigidly secured in place in the car, a plurality of parallel horizontal rails rigidly secured to said upright posts in spaced relation above the car floor and spaced vertically of the posts to form a plurality of tiers, said upright posts and longitudinal rails forming a plurality of rows extending the length of the car, each of said rows capable of supporting superposed tiers of engines, a plurality of rigid means secured to the rails at spaced points to serve as retainers for the engines at one end thereof, respectively, and a plurality of engine supports extending across from one rail to the adjacent rail and serving as retainers for the other ends of the engines, said means and said supports loosely holding the engines on the rails.

14. In an engine loading installation for application to a railroad car, a plurality of longitudinally and transversely spaced upright posts rigidly secured in place in the car, a plurality of parallel horizontal rails rigidly secured to said upright posts in spaced relation above the car floor, a plurality of engine supports extending across from one rail to the adjacent rail and serving as retainers for the engines one at one end of each engine, brackets at both sides of each engine near its other end adapted to rest on the rails, bolts passing through openings in the brackets and into the engines to hold the brackets on the engines, the openings in the brackets being considerably larger than the bolts to give a loose fit, second brackets rigidly secured to the rails and adapted to cooperate with the first brackets, said first and second brackets having a loose interconnection to cause said other end of the engines, respectively, to be held on the rails.

15. In an engine loading installation for application to a railroad car, a plurality of longitudinally and transversely spaced upright posts rigidly secured in place in the car, a plurality of parallel horizontal rails rigidly secured to said upright posts in spaced relation above the car floor, a plurality of engine supports one for each engine to be loaded and each support extending across from one rail to the adjacent rail and serving as a retainer for one end of the engine supported thereby, brackets at the other end of each engine and on opposite sides thereof adapted to rest on the rails, bolts passing through openings in the brackets and into the engine to hold the brackets on the engine, the openings in the brackets being considerably larger than the bolts to give a loose fit, said bolts each having a part thereof adapted to limit the extent to which the bolts can be screwed into the engine, said part being longer than the brackets are thick thereby to afford a degree of looseness longitudinally of the bolts between the bolts and the brackets, second brackets rigidly secured to the rails and adapted to cooperate with the first brackets, said first and second brackets having a loose interconnection to cause the said other end of the engines to be held on the rails.

16. In an engine loading installation for application to a railroad car for the mounting of a number of engines therein, a plurality of longitudinally and transversely spaced upright posts rigidly secured in place in the car, a plurality of parallel horizontal rails rigidly secured to said upright posts in spaced relation above the car floor, a plurality of engine supports extending across from one rail to the adjacent rail and serving as retainers each for one end of the engines, respectively, brackets at each side of and at the other ends of the engines, a shoe secured to each bracket and adapted to rest on the rails, bolts passing through openings in the brackets and into the engines to hold the brackets on the engine, the openings in the brackets being considerably larger than the bolts to give a loose fit, second brackets rigidly secured to the rails and adapted to cooperate with the first brackets, said first and second brackets having a loose interconnection to cause the other end of each engine to be held on the rails.

17. In an engine loading installation for application to a railroad car, a plurality of longitudinally and transversely spaced upright posts rigidly secured in place in the car, a plurality of parallel horizontal rails rigidly secured to said upright posts in spaced relation above the car floor, a plurality of engine supports extending across from one rail to the adjacent rail and serving as retainers for one end of the engines, brackets at each side of the engines, a shoe secured to each bracket and adapted to rest on the rails, said shoe projecting away from both sides of the brackets to adapt the brackets for use on both sides of the engines, bolts passing through openings in the brackets and into the engines to hold the brackets on the engines, the openings in the brackets being considerably larger than the bolts to give a loose fit, second brackets rigidly secured to the rails and adapted to cooperate with the first brackets, said first and second brackets having a loose interconnection to cause the other end of the engines to be held on the rails.

PAUL S. PROCISSI.

REFERENCES CITED

The following references are of record in the file of this patent:

UNITED STATES PATENTS

| Number | Name | Date |
| --- | --- | --- |
| 2,198,155 | Fahland | Apr. 23, 1940 |
| 1,937,617 | Willoughby | Dec. 5, 1933 |